United States Patent
Okumura et al.

(10) Patent No.: US 9,886,224 B2
(45) Date of Patent: Feb. 6, 2018

(54) TERMINAL DEVICE AND PRINTER

(71) Applicant: Brother Kogyo Kabushiki Kaisha, Nagoya-shi, Aichi-ken (JP)

(72) Inventors: Fumio Okumura, Nagoya (JP); Naoto Shiraga, Nagoya (JP); Takeshi Miyake, Nagoya (JP); Takanobu Suzuki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/383,394

(22) Filed: Dec. 19, 2016

(65) Prior Publication Data
US 2017/0097799 A1 Apr. 6, 2017

Related U.S. Application Data

(62) Division of application No. 14/317,000, filed on Jun. 27, 2014, now Pat. No. 9,542,134.

(30) Foreign Application Priority Data

Jun. 28, 2013 (JP) .................. 2013-136528

(51) Int. Cl.
*G06F 3/12* (2006.01)
*H04W 4/00* (2009.01)

(52) U.S. Cl.
CPC .......... *G06F 3/1238* (2013.01); *G06F 3/1203* (2013.01); *G06F 3/1204* (2013.01);
(Continued)

(58) Field of Classification Search
None
See application file for complete search history.

(56) References Cited

U.S. PATENT DOCUMENTS 8,208,161 B2 * 6/2012 Levier ............... H04N 1/00132
271/287
8,749,823 B2 * 6/2014 Kato .................... G06F 3/1222
358/1.14

(Continued)

FOREIGN PATENT DOCUMENTS

CN 101321226 A 12/2008
CN 102356627 A 2/2012

(Continued)

OTHER PUBLICATIONS

Jun. 25, 2013—"What is Google Cloud Print", online, <URL: http://developers.google.com/cloud-print/> and <URL: http://developers.google.com/cloud-print/docs/overview>.

(Continued)

*Primary Examiner* — Ted Barnes
(74) *Attorney, Agent, or Firm* — Banner & Witcoff, Ltd.

(57) ABSTRACT

A terminal device may send a registration request to a print intermediation server. The registration request may cause the print intermediation server to register virtual printer related information. The terminal device may receive authentication information from the print intermediation server. The terminal device may send image data related information to the print intermediation server. The image data related information may be related to target image data representing a target image of a print target. The image data related information may be associated with the virtual printer related information and the authentication information in the print intermediation server. The terminal device may send the authentication information to an actual printer. The authentication information may be used by the actual printer to obtain target print data. The target print data may be data which is created from the target image data by the print intermediation server.

11 Claims, 7 Drawing Sheets

(52) U.S. Cl.
CPC .......... *G06F 3/1222* (2013.01); *G06F 3/1258* (2013.01); *G06F 3/1268* (2013.01); *G06F 3/1278* (2013.01); *G06F 3/1289* (2013.01); *G06F 3/1292* (2013.01); *H04W 4/008* (2013.01)

(56) References Cited

U.S. PATENT DOCUMENTS

| | | | | |
|---|---|---|---|---|
| 8,780,377 | B2 | 7/2014 | Nishida et al. | |
| 8,914,852 | B2 | 12/2014 | Itogawa et al. | |
| 9,128,647 | B2 | 9/2015 | Minagawa | |
| 2002/0078162 | A1* | 6/2002 | Kimura | G06F 8/60 709/213 |
| 2002/0140972 | A1* | 10/2002 | Onishi | G06F 21/608 358/1.15 |
| 2003/0005050 | A1* | 1/2003 | Pineau | G06Q 30/02 709/203 |
| 2003/0098993 | A1* | 5/2003 | Ohara | G06F 3/1205 358/1.15 |
| 2003/0231339 | A1* | 12/2003 | Makishima | G06F 3/1206 358/1.15 |
| 2005/0002058 | A1* | 1/2005 | Hirabayashi | H04N 1/00132 358/1.15 |
| 2007/0146778 | A1* | 6/2007 | Kitagata | G06F 3/1204 358/1.15 |
| 2007/0283157 | A1* | 12/2007 | Yami | H04L 9/0844 713/175 |
| 2008/0304088 | A1* | 12/2008 | Tomihisa | G06F 21/608 358/1.9 |
| 2009/0036056 | A1* | 2/2009 | Oshima | H04M 1/7253 455/41.3 |
| 2010/0091321 | A1* | 4/2010 | Levier | H04N 1/00132 358/1.15 |
| 2010/0225962 | A1* | 9/2010 | Okigami | H04L 63/0492 358/1.15 |
| 2011/0058202 | A1* | 3/2011 | St Jacques, Jr. | G06F 3/1203 358/1.13 |
| 2011/0242569 | A1* | 10/2011 | Ohara | G06F 3/1205 358/1.13 |
| 2011/0242599 | A1* | 10/2011 | Ohara | H04L 29/12113 358/1.15 |
| 2011/0292445 | A1* | 12/2011 | Kato | G06F 3/1222 358/1.15 |
| 2012/0162681 | A1* | 6/2012 | Tomita | G06F 3/1222 358/1.13 |
| 2013/0003106 | A1* | 1/2013 | Nishida | G06F 3/1222 358/1.14 |
| 2013/0070288 | A1* | 3/2013 | Muranaka | G06F 3/1204 358/1.15 |
| 2013/0077125 | A1* | 3/2013 | Kitagata | G06F 3/1204 358/1.14 |
| 2013/0086638 | A1* | 4/2013 | Itogawa | G06F 21/34 726/4 |
| 2013/0114107 | A1* | 5/2013 | Park | G06F 3/1247 358/1.15 |
| 2013/0179961 | A1* | 7/2013 | Abe | G06F 21/44 726/9 |
| 2013/0260683 | A1* | 10/2013 | Suzuki | H04W 4/008 455/41.1 |
| 2013/0286425 | A1* | 10/2013 | Nakamura | G06F 3/1204 358/1.13 |
| 2014/0226179 | A1* | 8/2014 | Minagawa | G06F 3/1204 358/1.15 |
| 2014/0313539 | A1* | 10/2014 | Kawano | G06F 21/44 358/1.14 |
| 2014/0342665 | A1* | 11/2014 | Amano | H04W 52/0229 455/41.1 |
| 2014/0368859 | A1* | 12/2014 | Gutnik | G06F 3/1206 358/1.14 |
| 2014/0373103 | A1* | 12/2014 | Hirata | G06F 21/31 726/4 |
| 2015/0036189 | A1* | 2/2015 | Shiraga | G06F 3/1288 358/1.15 |
| 2015/0036191 | A1* | 2/2015 | Suzuki | G06F 3/1292 358/1.15 |
| 2015/0126115 | A1* | 5/2015 | Yun | H04L 63/0492 455/41.1 |

FOREIGN PATENT DOCUMENTS

| | | |
|---|---|---|
| JP | 2003-280832 A | 10/2003 |
| JP | 2008-040963 A | 2/2008 |
| JP | 2009-070240 A | 4/2009 |
| JP | 2012-064030 A | 3/2012 |
| JP | 2013-012066 A | 1/2013 |
| JP | 2013-033437 A | 2/2013 |
| JP | 2013-073314 A | 4/2013 |
| JP | 2013-080300 A | 5/2013 |
| JP | 2014123320 A | 7/2014 |
| WO | 2010107125 A1 | 9/2010 |

OTHER PUBLICATIONS

Oct. 27, 2014—(EP) Extended European Search Report—App 14173971.4.
Jan. 16, 2015—(US) Non-Final Office Action—U.S. Appl. No. 14/447,660.
Oct. 22, 2015—(US) Notice of Allowance—U.S. Appl. No. 14/447,665.
Aug. 6, 2015—(CN) First Office Action—U.S. Appl. No. 201410301816.8.
Sep 14, 2015—(US) Notice of Allowance—U.S. Appl. No. 14/447,660.
Jan. 20, 2015—(US) Notice of Allowance—U.S. Appl. No. 14/448,026.
Apr. 13, 2015—(US) Notice of Allowance—U.S. Appl. No. 14/447,724.
Feb. 21, 2017—(JP) Notification of Reasons for Rejection—App 2013-159538.
Feb. 21, 2017—(JP) Notification of Reasons for Rejection—App 2013-159539.
"What is Google Cloud Print", online, Jun. 25, 2013, <URL: http://developers.google.com/cloud-print/> and <URL:http://developers.google.com/cloud-print/docs/overview>.
Jul. 31, 2014—(US) Co-pending U.S. Appl. No. 14/447,660.
Jul. 31, 2014—(US) Co-pending U.S. Appl. No. 14/447,665.
Jul. 31, 2014—(US) Co-pending U.S. Appl. No. 14/447,724.
Jul. 31, 2014—(US) Co-pending U.S. Appl. No. 14/448,026.
Jan. 2, 2015—(US) Non-Final Office Action—U.S. Appl. No. 14/447,665.
Jun. 23, 2015—(US) Final Office Action—U.S. Appl. No. 14/447,660.
Co-pending U.S. Appl. No. 141317,000, filed Jun. 27, 2014.
Aug. 6, 2015—(CN) Notification of First Office Action—App 201410301816.8.

* cited by examiner

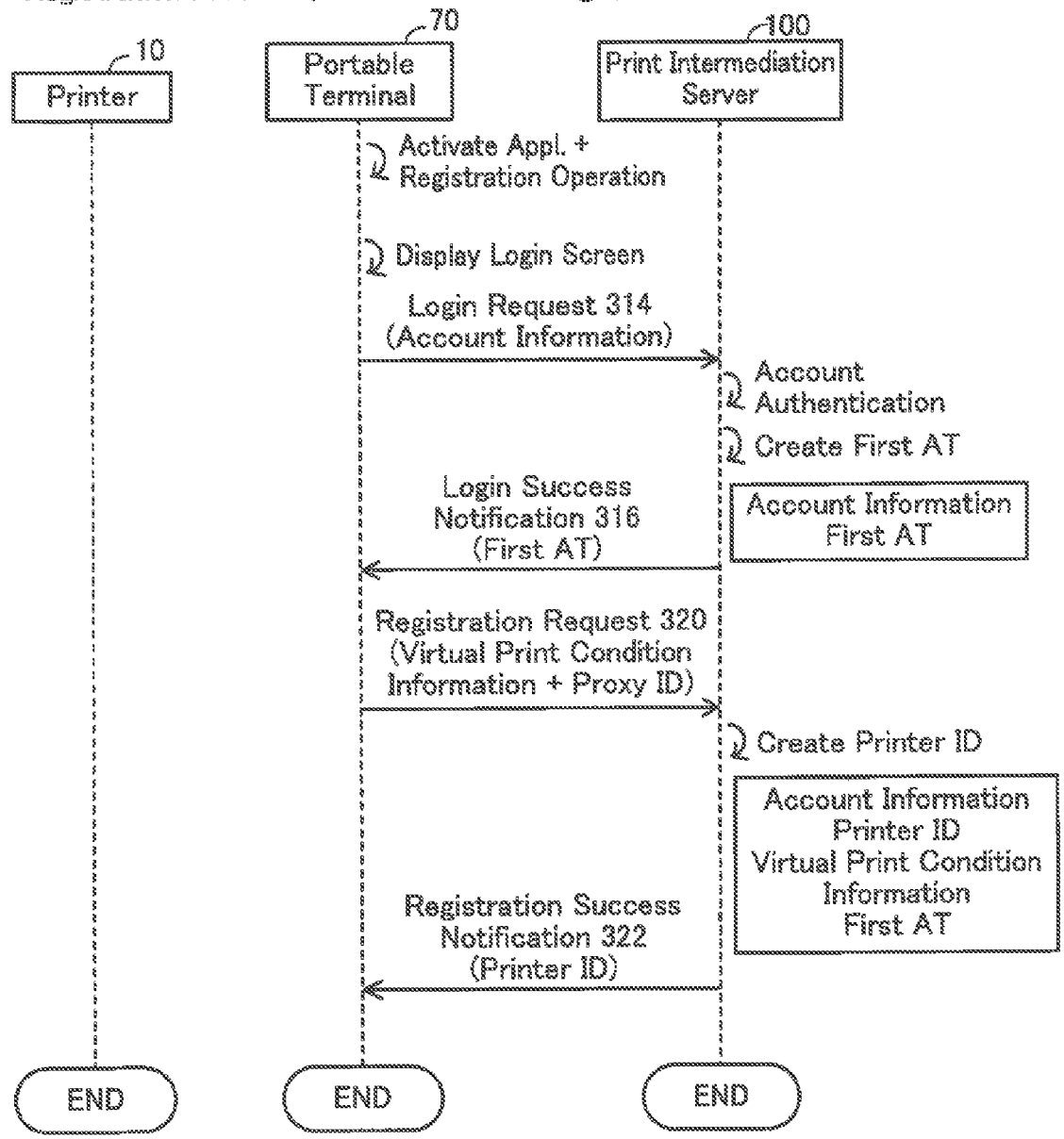

TERMINAL DEVICE AND PRINTER

CROSS-REFERENCE TO RELATED APPLICATIONS

This application is a Divisional of U.S. patent application Ser. No. 14/317,000 filed Jun. 27, 2014 which claims priority to Japanese Patent Application No. 2013-136528, filed on Jun. 28, 2013, the contents of which are hereby incorporated by reference into the present application.

TECHNICAL FIELD

The present specification discloses a technique whereby a terminal device causes a printer to perform a print using a print intermediation server.

DESCRIPTION OF RELATED ART

A technique of causing a printer to perform a print, by sending data from a terminal device to a server, and receiving at the printer the data from the server is known. For example, a service on the Internet called Google (registered trademark) Cloud Print (referred to as "GCP" below) is known. For example, a user accesses a printer by using a terminal device, and causes the printer to perform a communication with a server which provides the GCP (referred to as a "GCP server" below). By this means, the printer can register printer related information including a name of the printer, a print condition which can be used by the printer, a default setting of the printer and the like, in the GCP server. Subsequently, for example, the user submits to the GCP server image data which represents an image of a print target by using the terminal device. By this means, the printer can obtain print data which is created from the image data by the GCP server, and perform a print of an image represented by the print data. That is, the print data created by the GCP server can be interpreted by the printer.

SUMMARY

According to the above technique, the user needs to cause the printer to perform a communication with the server to register the printer related information in the server. The present specification provides a technique that does not have to cause a printer to perform a communication with a print intermediation server to register printer related information in the print intermediation server.

A terminal device disclosed in the present specification may comprise a processor. The terminal device may comprise an instruction memory storing computer-readable instructions therein. The computer-readable instructions, when executed by the processor, may cause the terminal device to perform sending a registration request to a print intermediation server, the registration request causing the print intermediation server to register virtual printer related information in the print intermediation server, the virtual printer related information being related to a virtual printer. The computer-readable instructions, when executed by the processor, may cause the terminal device to perform receiving authentication information from the print intermediation server. The computer-readable instructions, when executed by the processor, may cause the terminal device to perform sending image data related information to the print intermediation server after the virtual printer related information is registered in the print intermediation server, the image data related information being related to target image data representing a target image of a print target, the image data related information being associated with the virtual printer related information and the authentication information in the print intermediation server. The computer-readable instructions, when executed by the processor, may cause the terminal device to perform sending to an actual printer the authentication information which is associated with the virtual printer related information and the image data related information in the print intermediation server, the authentication information being used by the actual printer to obtain target print data, the target print data being created from the target image data by the print intermediation server.

A printer disclosed in the present specification may comprise a first interface. The printer may comprise a second interface being different from the first interface. The printer may comprise a print performing unit. The printer may comprise a processor. The printer may comprise a memory storing computer-readable instructions therein. The computer-readable instructions, when executed by the processor, may cause the printer to perform receiving authentication information from a terminal device via the first interface, the authentication information being received from a print intermediation server by the terminal device, the authentication information being associated with virtual printer related information and image data related information in the print intermediation server, the virtual printer related information being related to a virtual printer, the image data related information being related to target image data representing a target image of a print target. The computer-readable instructions, when executed by the processor, may cause the printer to perform sending, via the second interface, a request to the print intermediation server by using the authentication information, the request causing the print intermediation server to send target print data to the printer. The computer-readable instructions, when executed by the processor, may cause the printer to perform obtaining, via the second interface, the target print data from the print intermediation server in response to sending the request, the target print data being created from the target image data by the print intermediation server. The computer-readable instructions, when executed by the processor, may cause the printer to perform controlling the print performing unit to perform a print by using the target print data.

A control method, computer-readable instructions, and a non-transitory computer-readable medium storing the computer-readable instructions, for achieving any one of the above devices (that is, the terminal device or the printer), are also new and useful. Further, a communication system which has the above terminal device and printer (i.e. the actual printer) is also new and useful.

BRIEF DESCRIPTION OF THE DRAWINGS

FIG. 7 illustrates a sequence diagram of a registration process according to a second embodiment.

EMBODIMENT

First Embodiment

Figure 1:
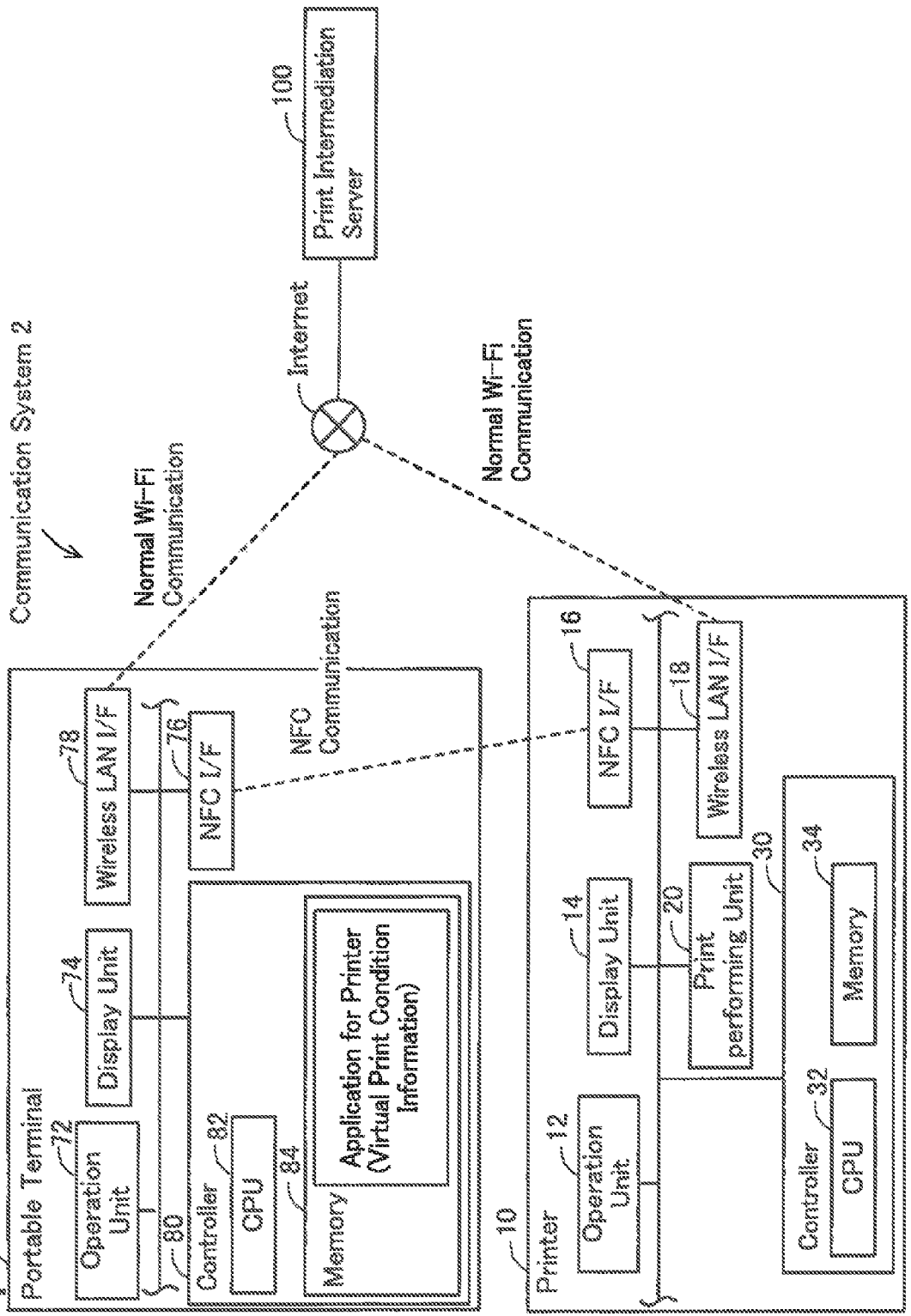
FIG. 1 illustrates a configuration of a communication system.

As illustrated in FIG. 1, a communication system 2 has a printer 10, a portable terminal 70 and a print intermediation server 100. Each of the devices 10, 70 and 100 can perform a communication with each other via the Internet.

Configuration of Printer 10

The printer 10 is a peripheral apparatus (i.e. peripheral apparatus of a PC or the like) which can perform a printing function. The printer 10 comprises an operation unit 12 and a display unit 14. Further, the printer 10 comprises an NFC (abbreviation of Near Field Communication) interface 16. Furthermore, the printer 10 comprises a wireless LAN (abbreviation of Local Area Network) interface 18. Still further, the printer 10 comprises a print performing unit 20. Moreover, the printer 10 comprises a controller 30. Each of the units 12 to 30 is connected to a bus line (a reference numeral is not illustrated). Hereinafter, the interface will be described as an "I/F".

The operation unit 12 comprises a plurality of keys. A user can give various instructions to the printer 10 by operating the operation unit 12. The display unit 14 is a display for displaying various pieces of information. The print performing unit 20 is a printing mechanism such as an ink jet printing or a laser printing.

The NFC I/F 16 is an I/F (i.e. an IC chip or a communication circuit) for performing a wireless communication in accordance with an NFC scheme for a so-called short distance wireless communication (referred to as an "NFC communication" below). The NFC scheme, for example, is a wireless communication scheme based on an international standard of ISO/IEC21481 or 18092.

The wireless LAN I/F 18 is an I/F (i.e. an IC chip or a communication circuit) for performing a wireless communication in accordance with the normal Wi-Fi scheme defined by the Wi-Fi Alliance (referred to as a "normal Wi-Fi communication" below). The normal Wi-Fi scheme, for example, is a wireless communication scheme based on the standard of 802.11 of IEEE (abbreviation of The Institute of Electrical and Electronics Engineers, Inc.) and a standard (e.g. 802.11a, 11b, 11g or 11n) equivalent to this standard.

Here, a difference between the NFC I/F 16 and the wireless LAN I/F 18 will be described. A communication speed (e.g. a maximum communication speed is 11 to 600 Mbps) of a wireless communication via the wireless LAN I/F 18 is faster than a communication speed (e.g. a maximum communication speed is 100 to 424 Kbps) of a wireless communication via the NFC I/F 16. Further, a frequency of a carrier wave (e.g. a 2.4 GHz band or a 5.0 GHz band) upon a wireless communication via the wireless LAN I/F 18 is different from a frequency of a carrier wave (e.g. a 13.56 MHz band) upon a wireless communication via the NFC I/F 16. Furthermore, for example, when a distance between the NFC I/F 16 of the printer 10 and an NFC I/F of another apparatus (e.g. the portable terminal 70) is about 10 cm or less, the controller 30 can perform an NFC communication with said apparatus via the NFC I/F 16. Meanwhile, even when a distance between the wireless LAN I/F 18 of the printer 10 and the wireless LAN I/F of another apparatus (e.g. the portable terminal 70) is 10 cm or less or 10 cm or more (e.g. about 100 m at maximum), the controller 30 can perform a Wi-Fi communication with the apparatus via the wireless LAN I/F 18. That is, a maximum distance at which the printer 10 can perform a wireless communication with another apparatus via the wireless LAN I/F 18 is longer than a maximum distance at which the printer 10 can perform a wireless communication with another apparatus via the NFC I/F 16.

The controller 30 comprises a CPU 32 and a memory 34. The CPU 32 is a processor which performs various processes in accordance with a program stored in the memory 34. The memory 34 is configured by a RAM, a ROM, a hard disk and the like. The memory 34 stores not only the above program but also various pieces of data created or obtained in a process in which the printer 10 performs various processes.

Configuration of Portable Terminal 70

The portable terminal 70 is a portable terminal device such as a mobile telephone (e.g. a smartphone), a PDA, a notebook PC, a tablet PC, a portable music playback device or a mobile movie playback device. The portable terminal 70 comprises an operation unit 72, a display unit 74, an NFC I/F 76, a wireless LAN I/F 78 and a controller 80. Each of the units 72 to 80 is connected to a bus line (a reference numeral is not illustrated).

The operation unit 72 comprises a plurality of keys. A user can give various instructions to the portable terminal 70 by operating the operation unit 72. The display unit 74 is a display for displaying various pieces of information. The NFC I/F 76 and the wireless LAN I/F 78 are the same as the NFC I/F 16 and the wireless LAN I/F 18 of the printer 10, respectively. Hence, the difference between the NFC I/F 76 and the wireless LAN I/F 78 is the same as the difference between the NFC I/F 16 and the wireless LAN I/F 18.

The controller 80 comprises a CPU 82 and a memory 84. The CPU 82 is a processor which performs various processes in accordance with a program stored in the memory 84. The memory 84 is configured by a RAM, a ROM, a hard disk and the like. The memory 84 stores not only the above program but also various pieces of data created or obtained in a process in which the portable terminal 70 performs various processes.

The memory 84 stores a printer application (referred to as a "printer appl." below) which causes the printer 10 to perform a print by using the print intermediation server 100. The printer appl. is an application provided by a vendor of the printer 10. The printer appl. may be installed to the portable terminal 70 from a server on the Internet or may be installed to the portable terminal 70 from a medium shipped together with the printer 10.

Configuration of Print Intermediation Server 100

The print intermediation server 100 is a server which is located on the Internet, and is, for example, a GCP server provided by Google (registered trademark). In this regard, in modified embodiments, the print intermediation server 100 may be a server provided by the vendor of the printer 10 or may be a server provided by a business operator different from the vendor of the printer 10.

The print intermediation server 100 is a server for performing an intermediation of a print between an external apparatus (e.g. the portable terminal 70) and a printer (e.g. the printer 10). That is, the print intermediation server 100 converts image data submitted from the external apparatus, creates print data in a data format which can be interpreted by the printer, and supplies the print data to the printer. Therefore, even when the external apparatus does not comprise a printer driver for converting the image data into the print data, the external apparatus can cause the printer to perform a print by submitting the image data to the print intermediation server 100.

Advance Preparation

As described above, for example, the portable terminal 70 can cause the printer 10 to perform a print via the print intermediation server 100. Various processes for this print will be described below with reference to FIGS. 2 to 5. It should be noted that, the user of the portable terminal 70 needs to perform the following advance preparation to achieve an operation of the portable terminal 70 disclosed in FIGS. 2 to 5.

That is, the user needs to register account information in the print intermediation server 100 by using, for example, the portable terminal 70. The account information includes, for example, a user ID, a password and the like. It should be noted that, the user may register account information in the print intermediation server 100 by using another apparatus (e.g. a PC) instead of using the portable terminal 70. When the account information of the user is registered in the print intermediation server 100, the user can cause the printer 10 to perform a print via the print intermediation server 100 by using the portable terminal 70.

Figure 2:
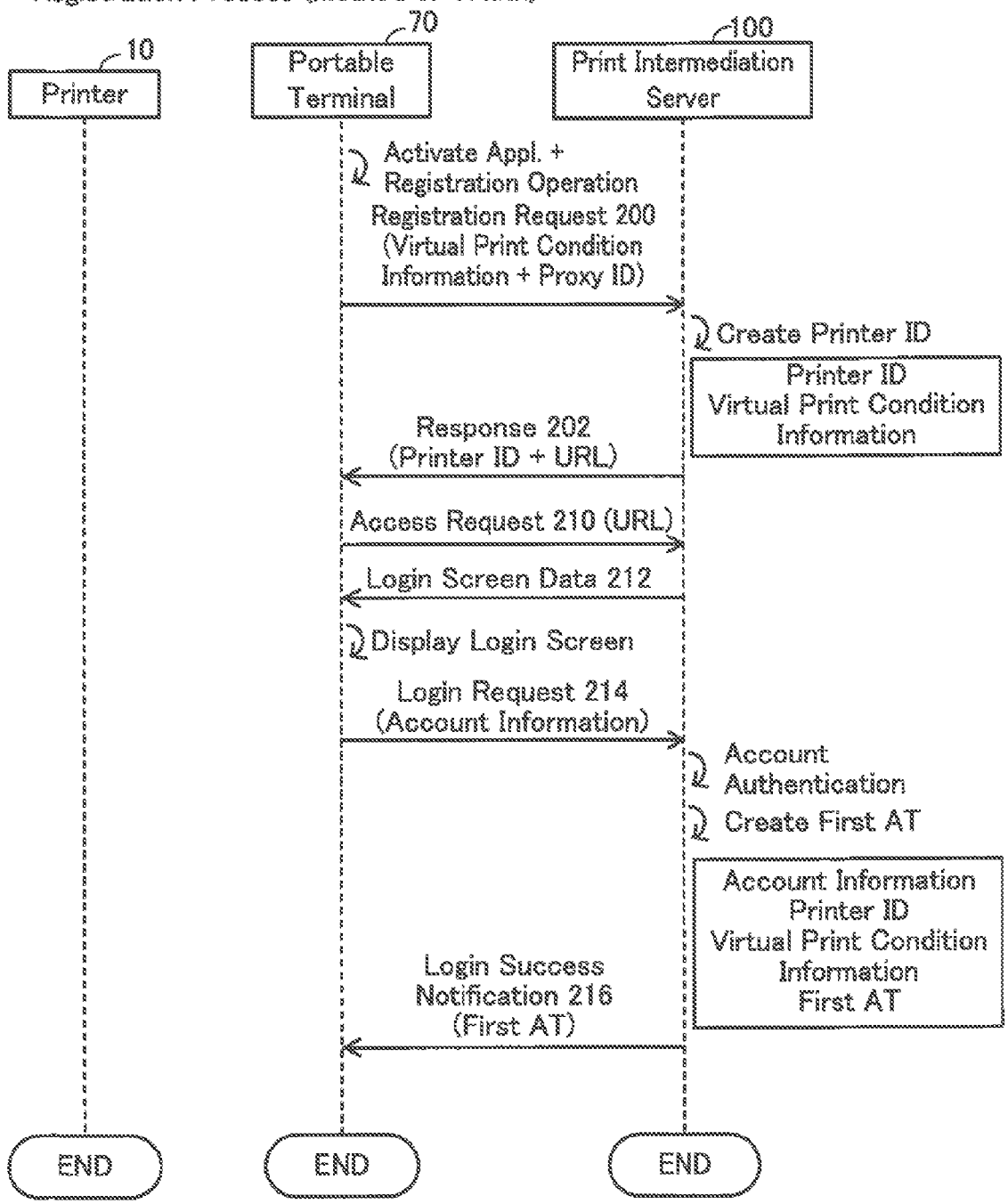
FIG. 2 illustrates a sequence diagram of a registration process.

Registration Process; FIG. 2

Subsequently, a registration process for registering information which is necessary for the portable terminal 70 in the print intermediation server 100 will be described with reference to FIG. 2. In the present embodiment, the registration process using OAuth is performed. In a second embodiment described below, a registration process using Client Login is performed (see FIG. 7).

In the registration process, the user of the portable terminal 70 may not be present near the printer 10. That is, for example, in a situation that the printer 10 is located at home and the user goes out carrying the portable terminal 70, the user can register various pieces of information in the print intermediation server 100 by using the portable terminal 70.

The user of the portable terminal 70 first activates the printer appl. installed in the portable terminal 70, and selects a button indicating "registration" on a screen which is displayed in accordance with the printer appl. In this case, the CPU 82 of the portable terminal 70 performs each process illustrated in FIG. 2 in accordance with the printer appl.

The CPU 82 of the portable terminal 70 first obtains virtual print condition information registered in advance in the printer appl., from the memory 84. The virtual print condition information is information indicating a virtual print condition which can be used by a virtual printer, not an actual printer (e.g. the printer 10), and is information determined in advance by the vendor of the printer 10. It should be noted that, as illustrated in FIG. 1, the virtual print condition information is registered in advance in the printer appl. Hence, the virtual print condition information is not obtained from the actual printer (e.g. the printer 10), but is stored in advance in the memory 84.

The virtual print condition includes, for example, sizes of print sheets (i.e. sheet sizes) on which images need to be printed, information indicating whether it is capable of performing duplex printing, the number of colors (e.g. monochrome print or color print) and the like. In the present embodiment, the virtual print condition determined in advance includes "A4" and "B5" as sheet sizes, includes "negative information" indicating that it it not capable of duplex printing, and includes "monochrome print" and "color print" as the number of colors. The virtual print condition may further include other conditions such as page orientation (e.g. landscape print and portrait print).

Next, the CPU 82 of the portable terminal 70 obtains a proxy ID of the portable terminal 70 (i.e. an ID for identifying the portable terminal 70) from the memory 84. Then, the CPU 82 sends a registration request 200 including the virtual print condition information and the proxy ID to the print intermediation server 100 via the wireless LAN I/F 78 (i.e. via the Internet). It should be noted that, a URL of the print intermediation server 100 (i.e. a URL of a sending destination of the registration request 200) is registered in advance in the printer appl. The URL of the request sending destination may be a URL registered in advance in the printer appl. unless described in particular below. In this regard, the URL of the request sending destination may be a URL obtained from the print intermediation server 100 before the request is sent.

When receiving the registration request 200 from the portable terminal 70, the print intermediation server 100 creates a printer ID for identifying a registration target printer by using the proxy ID included in the registration request 200. The portable terminal 70 does not specify the actual printer (e.g. the printer 10) as a registration target printer (that is, the registration request 200 does not include print condition information of the actual printer, a proxy ID of the actual printer and the like), and therefore the printer ID created by the print intermediation server 100 is an ID for identifying a virtual printer.

The print intermediation server 100 associates the created printer ID of the virtual printer with the virtual print condition information included in the registration request 200 and stores them. In FIG. 2, boxes on the right of the broken line corresponding to the print intermediation server 100 indicate that each pieces of information in the boxes is associated with each other. The same also applies to FIG. 3 and subsequent figures.

Next, the print intermediation server 100 sends to the portable terminal 70 a response 202 including the created printer ID and a login URL which indicates a location of login screen data 212 described below.

When receiving the response 202 from the print intermediation server 100 via the wireless LAN I/F 78, the CPU 82 of the portable terminal 70 stores in the memory 84 the printer ID included in the response 202. Next, the CPU 82 sends an access request 210 to the print intermediation server 100 via the wireless LAN I/F 78 with the login URL included in the response 202 as the sending destination.

When receiving the access request 210 from the portable terminal 70, the print intermediation server 100 sends the login screen data 212 to the portable terminal 70. The login screen data 212 is data which represents a login screen for inputting account information (i.e. a user ID, a password and the like).

When receiving the login screen data 212 from the print intermediation server 100 via the wireless LAN I/F 78, the CPU 82 of the portable terminal 70 displays on the display unit 74 the login screen represented by the login screen data 212. The user inputs, in the portable terminal 70 by using the operation unit 72, the account information registered in the print intermediation server 100 upon the above advance preparation. In this case, the CPU 82 sends a login request 214 including the inputted account information, to the print intermediation server 100 via the wireless LAN I/F 78.

It should be noted that, although the account information is inputted to the portable terminal 70 by the user in the present embodiment, when, for example, the above advance preparation is performed by using the portable terminal 70, the memory 84 of the portable terminal 70 may store the account information in the modified embodiments. In this case, the CPU 82 of the portable terminal 70 may obtain the account information from the memory 84 without causing the user to input the account information, and send the login request 214 including the account information to the print intermediation server 100. It should be noted that, in a process subsequent to FIG. 3, this modified embodiment may be adopted in a situation that a login request is sent from the portable terminal 70 to the print intermediation server 100.

When receiving the login request 214 from the portable terminal 70, the print intermediation server 100 performs authentication of the account information included in the login request 214. More specifically, the print intermediation server 100 judges whether or not the account information included in the login request 214 is already registered in the print intermediation server 100. When judging that the account information is not yet registered, that is, when failing to authenticate the account information, the print intermediation server 100 sends a login failure notification to the portable terminal 70 although not illustrated. In this case, the registration process is finished without performing subsequent processes.

Meanwhile, when judging that the account information is already registered, that is, when succeeding to authenticate the account information, the print intermediation server 100 creates a token which is a unique character string. The token is information for authentication which is used in subsequent processes (e.g. a print process in FIG. 5). The token created herein is referred to as a "first AT (abbreviation of Authentication (or Access) Token)" below.

Next, the print intermediation server 100 associates the successfully authenticated account information, the printer ID of the virtual printer, the virtual print condition information and the created first AT with each other and stores them. Then, the print intermediation server 100 sends a login success notification 216 including the created first AT to the portable terminal 70.

When receiving the login success notification 216 from the print intermediation server 100 via the wireless LAN I/F 78, the CPU 82 of the portable terminal 70 stores in the memory 84 the first AT included in the login success notification 216. By this means, the registration process is finished.

As described above, in the registration process, a method of registering a printer ID of a virtual printer and virtual print condition information in the print intermediation server 100 instead of registering a printer ID of an actual printer (e.g. the printer 10) and print condition information in the print intermediation server 100 is adopted. That is, the portable terminal 70 sends the registration request 200 to the print intermediation server 100, and registers the printer ID of the virtual printer and the virtual print condition information in the print intermediation server 100. Hence, the user does not have to cause the printer 10 to perform a communication with the print intermediation server 100 to register the printer ID and the virtual print condition information (moreover, the first AT) in the print intermediation server 100.

Figure 3:
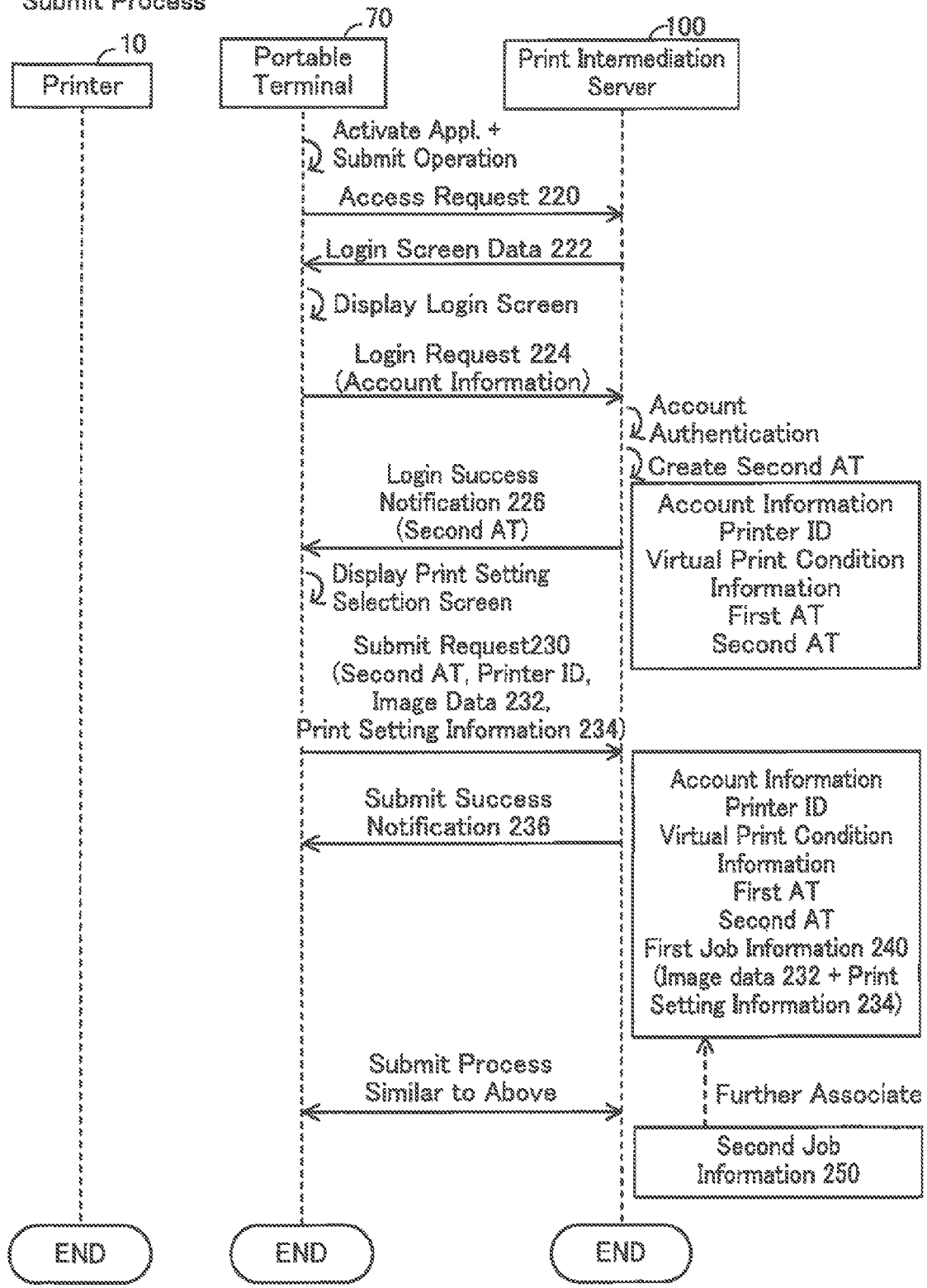
FIG. 3 illustrates a sequence diagram of a submit process.

Submit Process; FIG. 3

Subsequently, a submit process for submitting image data which represents a print target image from the portable terminal 70 to the print intermediation server 100 will be described with reference to FIG. 3. Also in the submit process, the user of the portable terminal 70 may not be present near the printer 10 similar to the registration process. For example, the user can submit image data which represents an image captured by the portable terminal 70 at a visiting place, to the print intermediation server 100.

When desiring to submit image data to the print intermediation server 100, the user of the portable terminal 70 activates the printer appl., and selects a button indicating "submit" on the screen displayed in accordance with the printer appl. Further, the user specifies image data stored in the memory 84 of the portable terminal 70. It should be noted that, the image data may be in any data format as long as the image data is data which represents a print target image, and may be data in a bitmap format such as JPEG (abbreviation of Joint Photographic Experts Group), may be data in a vector format, may be data in a text format or may be data in other formats. When each of the above operations is performed on the portable terminal 70, the CPU 82 of the portable terminal 70 performs each process illustrated in FIG. 3 in accordance with the printer appl.

The CPU 82 of the portable terminal 70 first sends an access request 220 to the print intermediation server 100 via the wireless LAN I/F 78.

When receiving the access request 200 from the portable terminal 70, the print intermediation server 100 sends login screen data 222 to the portable terminal 70.

When receiving the login screen data 222 from the print intermediation server 100 via the wireless LAN I/F 78, the CPU 82 of the portable terminal 70 controls the display unit 74 to display the login screen represented by the login screen data 222. The user inputs the account information in the portable terminal 70 by using the operation unit 72. In this case, the CPU 82 sends a login request 224 including the inputted account information to the print intermediation server 100 via the wireless LAN I/F 78.

When receiving the login request 224 from the portable terminal 70, the print intermediation server 100 performs authentication of the account information included in the login request 224. When succeeding to authenticate the account information, the print intermediation server 100 creates a second AT which is a token different from the first AT. Next, the print intermediation server 100 associates the successfully authenticated account information with the created second AT and stores them. As a result, in the print intermediation server 100, each pieces of information (i.e. the account information, the printer ID, the virtual print condition information and the first AT) stored in the registration process in FIG. 2 are associated with the created second AT. Then, the print intermediation server 100 sends a login success notification 226 including the created second AT, to the portable terminal 70.

When receiving the login success notification 226 from the print intermediation server 100 via the wireless LAN I/F 78, the CPU 82 of the portable terminal 70 controls the display unit 74 to display a print setting selection screen. More specifically, the CPU 82 obtains the virtual print condition information registered in advance in the printer appl., from the memory 84, and controls the display unit 74 to display the print setting selection screen for causing the user to select a print setting for printing an image from the virtual print condition indicated by the virtual print condition information.

As described above, the virtual print condition includes "A4" and "B5" as sheet sizes, includes "negative information" as information whether it is capable of performing duplex printing and includes "monochrome print" and "color print" as the number of colors. Hence, the print setting selection screen has a manner which enables a selection of "A4" or "B5" as a sheet size and enables a selection one of "monochrome print" and "color print" as the number of colors.

The user selects the print setting by selecting the sheet size (e.g. "A4") and the number of colors (e.g. "color") by using the operation unit 72 while looking at the print setting selection screen. Whether or not to perform duplex printing (i.e. "negative information") has no option and therefore is automatically implemented in the print setting.

Although described below in details, in the print intermediation server 100, print data is created in accordance with the selected print setting, and the print data is supplied to the printer 10 (see FIG. 5). As described above, the selected print setting is selected from the virtual print condition, and is not selected from a print condition which can be actually used by the printer 10. That is, there is no guarantee that the printer 10 can perform a print in accordance with the selected print setting. In this regard, in the present embodiment, the vendor of the printer 10 determines in advance a print condition which can be used by normal printers (e.g. all printers which are sold by the vendor) as the virtual print condition, and provides the printer appl. including the virtual print condition information indicating the virtual print condition. Consequently, in the present embodiment, the printer 10 can properly perform a print in accordance with the selected print setting.

When the user selects a print setting, the CPU 82 of the portable terminal 70 sends to the print intermediation server 100 via the wireless LAN I/F 78 a submit request 230 including the received second AT, the printer ID of the virtual printer in the memory 84, image data 232 specified by the user and print setting information 234 indicating the print setting selected by the user.

When receiving the submit request 230 from the portable terminal 70, the print intermediation server 100 performs authentication of the second AT included in the submit request 230. When judging that the second AT is stored (that is, when succeeding to authenticate the second AT), the print intermediation server 100 associates each pieces of information included in the submit request 230 with each other and stores them. As a result, in the print intermediation server 100, each pieces of information (i.e. the account information, the printer ID, the virtual print condition information, the first AT and the second AT) stored upon creation of the second AT, is associated with first job information 240 (i.e. the image data 232 and the print setting information 234). Then, the print intermediation server 100 sends a submit success notification 236 to the portable terminal 70.

The CPU 82 of the portable terminal 70 receives the submit success notification 236 from the print intermediation server 100 via the wireless LAN I/F 78. By this means, the submit process for submitting one piece of job information 240 is finished. It should be noted that, when the user further desires to submit other image data to the print intermediation server 100, the same operation as the above is performed. By this means, the CPU 82 of the portable terminal 70 can further submit second job information 250 to the print intermediation server 100 by performing the same process as the above. As a result, in the print intermediation server 100, the two pieces of job information (i.e. the first and second job information 240 and 250) are associated with the account information, the printer ID and the like, and stored.

Figure 4:
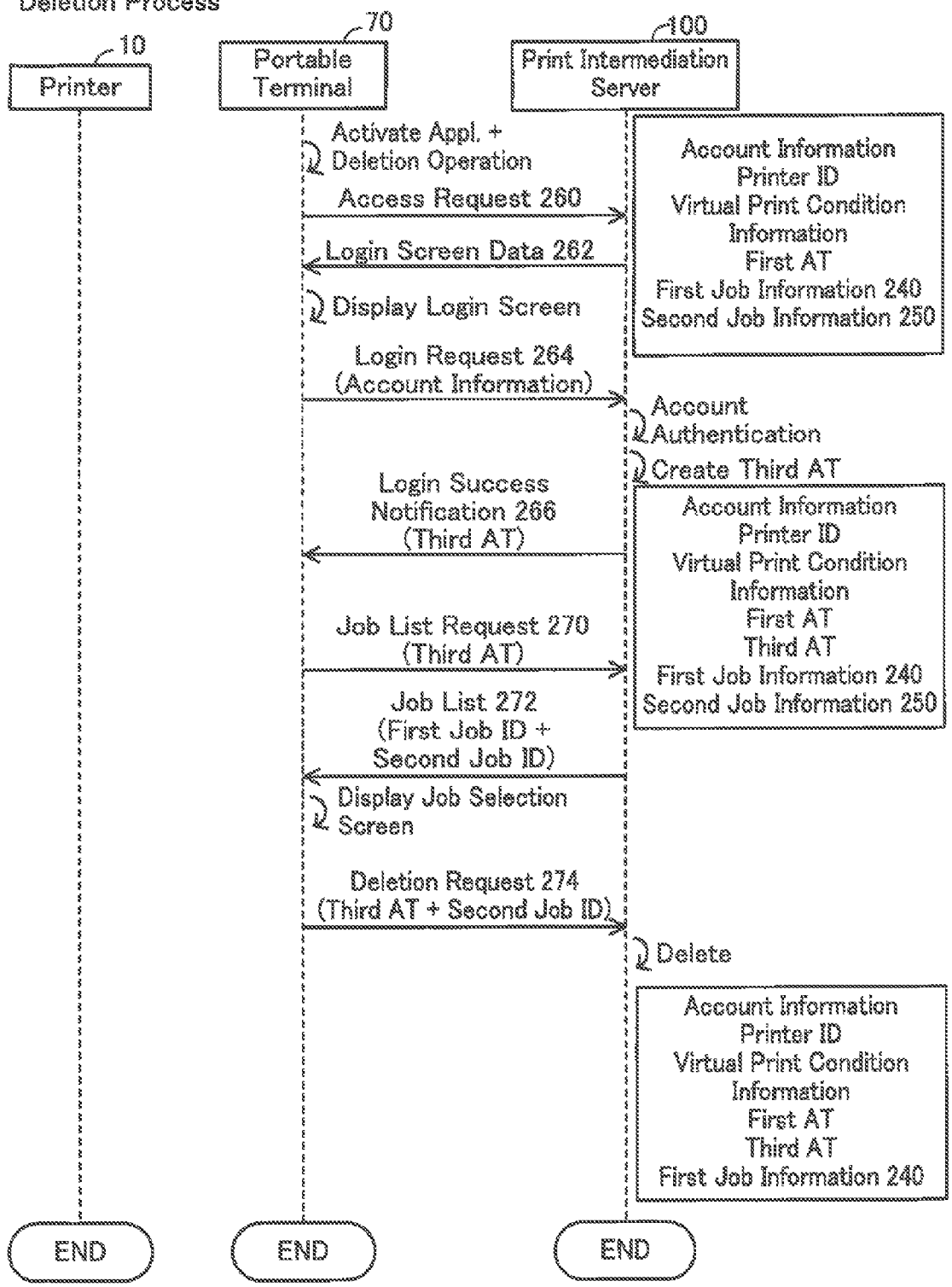
FIG. 4 illustrates a sequence diagram of a deletion process.

Deletion Process; FIG. 4

Subsequently, a deletion process in which the portable terminal 70 deletes job information from the print intermediation server 100 will be described with reference to FIG. 4. Also in the deletion process, the user of the portable terminal 70 may not be present near the printer 10.

In the print intermediation server 100, when performing the submit process in FIG. 3, the account information, the printer ID, the virtual print condition information, the first AT, the second AT, the first job information 240 and the second job information 250 are associated with each other. In this regard, as the second AT is a temporary token which is used only during the submit process, the second AT is not associated with them in FIG. 4.

When the user of the portable terminal 70 desires to stop performing a print in accordance with the second job information 250, the user activates the printer appl., and selects a button indicating "delete" on the screen displayed in accordance with the printer appl. In this case, the CPU 82 of the portable terminal 70 performs each process illustrated in FIG. 4 in accordance with the printer appl.

The CPU 82 of the portable terminal 70 first sends an access request 260 to the print intermediation server 100 via the wireless LAN I/F 78. A subsequent communication of login screen data 262 and a login request 264 is the same as the communication of the login screen data 222 and the login request 224 in FIG. 3.

When receiving the login request 264 from the portable terminal 70, the print intermediation server 100 performs authentication of the account information included in the login request 264. When succeeding to authenticate the account information, the print intermediation server 100 creates a third AT which is a token different from the first AT and the second AT. Next, the print intermediation server 100 associates the successfully authenticated account information with the created third AT and stores them. As a result, in the print intermediation server 100, each pieces of information (i.e. the account information, the printer ID, the virtual print condition information, the first AT, the first job information 240 and the second job information 250) stored in the submit process in FIG. 3 is associated with the created third AT. Then, the print intermediation server 100 sends a login success notification 266 including the created third AT, to the portable terminal 70.

When receiving the login success notification 266 from the print intermediation server 100 via the wireless LAN I/F 78, the CPU 82 of the portable 70 sends a job list request 270 including the received third AT, to the print intermediation server 100 via the wireless LAN I/F 78.

When receiving the job list request 270 from the portable terminal 70, the print intermediation server 100 performs authentication of the third AT included in the job list request 270. When judging that the third AT is stored (that is, when succeeding to authenticate the third AT), the print intermediation server 100 creates a job list 272 including first and second job IDs for identifying the first and second job information 240 and 250 associated with the third AT. The job ID may include, for example, a file name of image data included in job information corresponding to the job ID. In this case, by looking at the job ID, the user can learn which image data the job ID corresponds to. Then, the print intermediation server 100 sends the job list 272 to the portable terminal 70.

When receiving the job list 272 from the print intermediation server 100 via the wireless LAN I/F 78, the CPU 82 of the portable terminal 70 controls the display unit 74 to display a job selection screen. More specifically, the CPU 82 controls the display unit 84 to display the job selection screen for causing the user to select a job ID corresponding to deletion target job information from the first and second job IDs included in the job list 272. The user selects one or more job IDs by using the operation unit 72 while looking at the job selection screen. In an example in FIG. 4, the user selects the second job ID corresponding to the second job information 250.

When the user selects the second job ID, the CPU 82 of the portable terminal 70 sends a deletion request 274 including the received third AT and the second job ID selected by the user, to the print intermediation server 100 via the wireless LAN I/F 78.

When receiving the deletion request 274 from the portable terminal 70, the print intermediation server 100 deletes the second job information 250 corresponding to the second job ID included in the deletion request 274 from the first and second job information 240 and 250 associated with the third AT included in the deletion request 274. As a result, the print intermediation server 100 can delete the second job information 250 while maintaining a state where the account information, the printer ID, the first AT and the first job information 240 are associated with each other.

Print Process; FIG. 5

Subsequently, a print process in which the portable terminal 70 causes the printer 10 to perform a print in accordance with the first job information 240 will be described with reference to FIG. 5. In the print process, the user of the portable terminal 70 needs to be present near the printer 10. As described below, this is because the portable terminal 70 and the printer 10 need to perform an NFC communication. Hence, the user causes the printer 10 to perform a print by using the portable terminal 70 after going home from a visiting place.

When performing the deletion process in FIG. 4, in the print intermediation server 100, the account information, the printer ID, the virtual print condition information, the first AT, the third AT and the first job information 240 are associated with each other. In this regards, as the third AT is a temporary token which is used only during the deletion process, the third AT is not associated with them in FIG. 5.

When desiring to cause the printer 10 to perform a print in accordance with the first job information 240, the user of the portable terminal 70 activates the printer appl., and selects a button indicating "print" on the screen displayed in accordance with the printer appl. In this case, the CPU 82 of the portable terminal 70 performs each process illustrated in FIG. 5 in accordance with the printer appl.

The CPU 82 of the portable terminal 70 first obtains the first AT and the printer ID (i.e. each pieces of information stored in the memory 84 in the registration process in FIG. 2) from the memory 84. Then, the CPU 82 creates encrypted data by encrypting the first AT and the printer ID by using an encryption key registered in advance in the printer appl. An encryption method is not limited in particularly, and is, for example, AES (abbreviation of Advanced Encryption Standard), DES (abbreviation of Data Encryption Standard) or the like.

The user of the portable terminal 70 places the portable terminal 70 close to the printer 10. When a distance between the NFC I/F 76 of the portable terminal 70 and the NFC I/F 16 of the printer 10 is a predetermined distance (e.g. 10 cm) or less, the CPU 82 of the portable terminal 70 sends a print instruction and the encrypted data to the printer 10 via the NFC I/F 76. In this regard, the CPU 82 performs an NFC communication so that it can send the print instruction and the encrypted data to the printer 10 without using an IP address of a sending destination, a URL of the sending destination and the like. Further, as the first AT and the printer ID are encrypted, it is possible to prevent a third party from illegally obtaining the first AT and the printer ID.

When receiving the print instruction and the encrypted data from the portable terminal 70 via the NFC I/F 16, the CPU 32 of the printer 10 decrypts the encrypted data by using an encryption key stored in advance in the memory 34, that is, an encryption key matching the encryption key used by the portable terminal 70. By this means, the CPU 32 can obtain the first AT and the printer ID.

Next, the CPU 32 of the printer 10 sends a job list request 280 including the obtained first AT and the printer ID to the print intermediation server 100 via the wireless LAN I/F 18 (that is, via the Internet) with the URL of the print intermediation server 100 stored in advance in the memory 34 as the sending destination.

When receiving the job list request 280 from the printer 10, the print intermediation server 100 performs authentication of the first AT and the printer ID included in the job list request 280. Then, when judging that the first AT and the printer ID are stored (that is, when succeeding to authenticate the first AT and the printer ID), the print intermediation server 100 creates a job list 282 including a first job ID for identifying the first job information 240 associated with these pieces of information, and a URL indicating a location of print data 292 described below. Then, the print intermediation server 100 sends the job list 282 to the printer 10.

When receiving the job list 282 from the print intermediation server 100 via the wireless LAN I/F 18, the CPU 32 of the printer 10 sends a print data request 290 via the wireless LAN I/F 18 with the URL included in the job list 282 as the sending destination. It should be noted that, the print data request 290 includes information indicating a data format which can be interpreted by the printer 10. The data format is, for example, PDF (abbreviation of Portable Document Format).

When receiving the print data request 290 from the printer 10, the print intermediation server 100 performs a conversion process. That is, the print intermediation server 100 creates the print data 292 by converting the image data 232 included in the first job information 240 in accordance with the print setting information 234 included in the first job information 240 and information indicating the data format included in the print data request 290. For example, when the print setting information 234 includes "A4" as a sheet size, includes "negative information" as information indicating whether it is capable of performing duplex printing and includes "color" as the number of colors, the print intermediation server 100 creates the print data 292 for printing a color image on a single side of a print sheet of A4. Further, when the print data request 290 includes information indicating the PDF format, the print intermediation server 100 creates the print data 292 in the PDF format.

Next, the print intermediation server 100 stores the created print data 292 at a location corresponding to the URL included in the job list 282. Then, the print intermediation server 100 sends to the printer 10 the print data 292 stored at the location corresponding to the URL which is the sending destination of the print data request 290.

The CPU 32 of the printer 10 receives the print data 292 from the print intermediation server 100 via the wireless LAN I/F 18. By this means, the CPU 32 can obtain the print data 292 from the print intermediation server 100. Then, the CPU 32 supplies the obtained print data 292 to the print performing unit 20. As a result, the print performing unit 20 prints on a print sheet an image represented by the print data 292. By this means, the user of the portable terminal 70 can obtain the printed print sheet.

Figure 5:
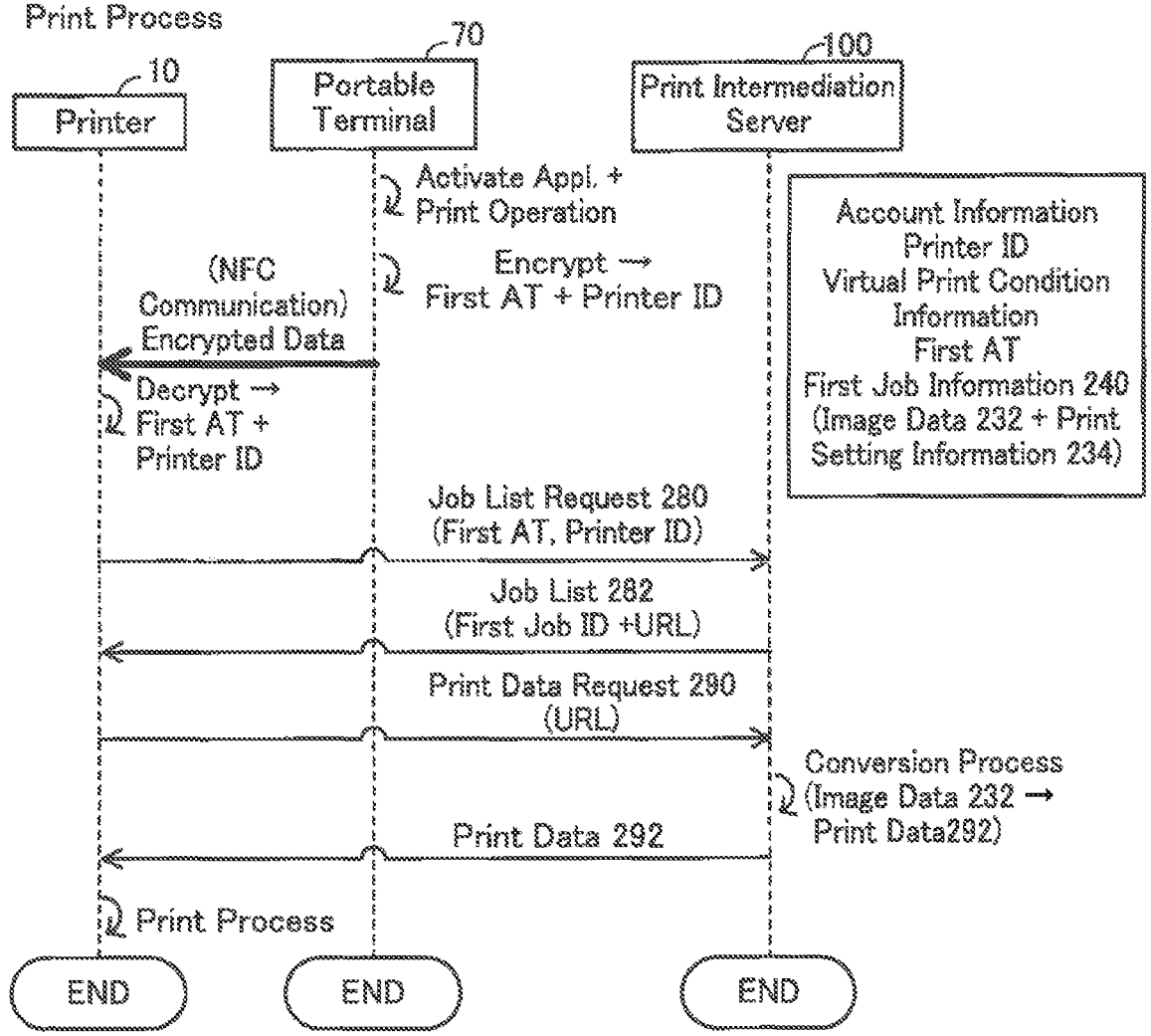
FIG. 5 illustrates a sequence diagram of a print process.

It should be noted that, although only one piece of job information 240 is stored in the print intermediation server 100 in the example in FIG. 5, if a plurality of pieces of job information (e.g. the first and second job information 240 and 250) is stored in the print intermediation server 100, the job list 282 includes a plurality of job IDs and a plurality of URLs.

The printer 10 sequentially sends, for each of a plurality of URLs included in the job list 282, a print data request with the URL as the sending destination. Then, every time the print data request is received from the printer 10, the print intermediation server 100 creates print data by converting image data included in job information corresponding to the print data request. By this means, the printer 10 can sequentially obtain each of a plurality of pieces of print data, and sequentially perform print of each of a plurality of images represented by the plurality of pieces of print data.

Figure 6:
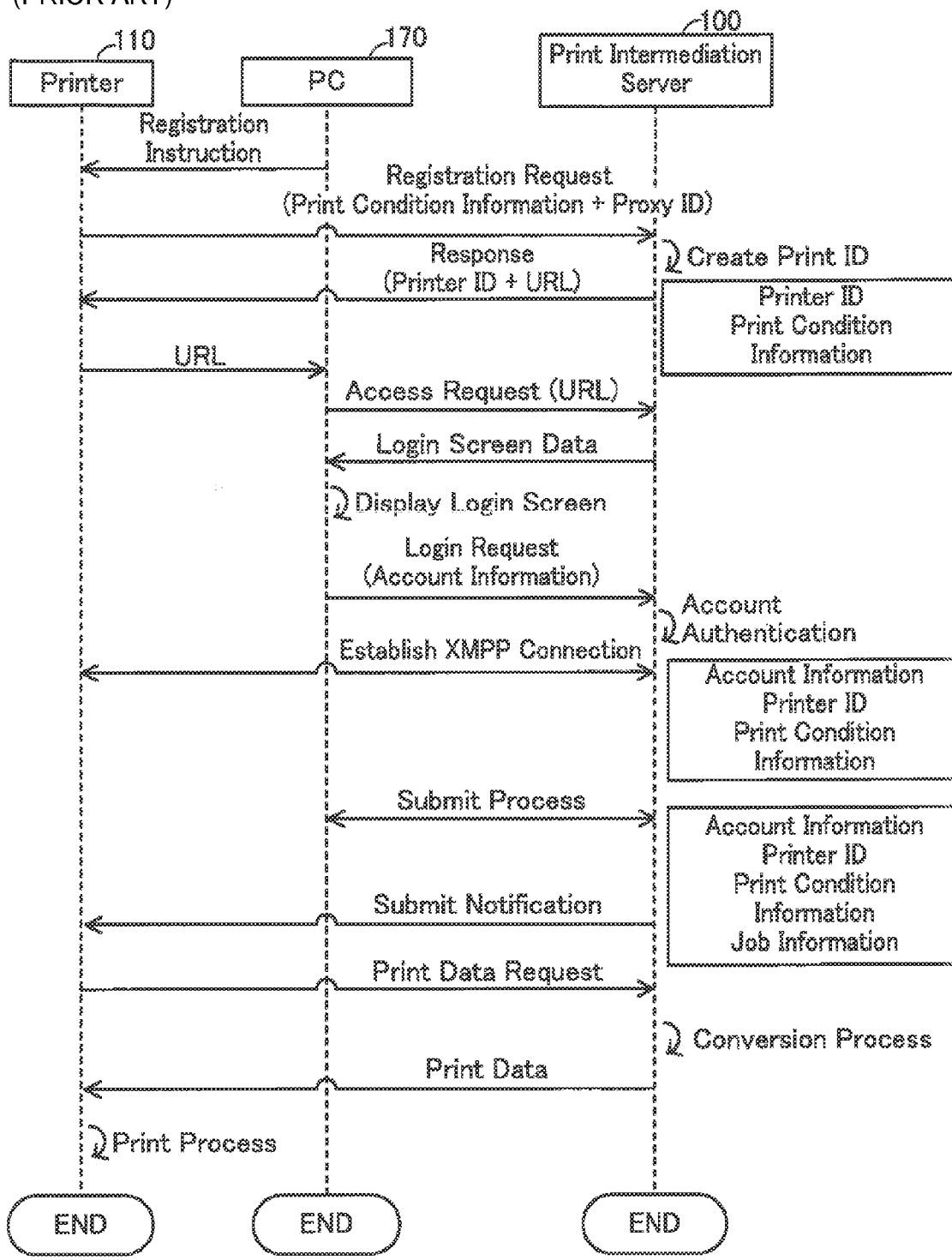
FIG. 6 illustrates a sequence diagram illustrating a prior art communication process.

Prior Art; FIG. 6

A prior art process will be described with reference to FIG. 6 before an effect according to the present embodiment will be described. As illustrated in FIG. 6, a system includes a printer 110, a PC 170 and the print intermediation server 100. The printer 110 and the PC 170 can perform a normal Wi-Fi communication, but cannot perform an NFC communication. Hence, all communications illustrated in FIG. 6 are normal Wi-Fi communications.

A user of the PC 170 first operates the PC 170 to access a web server function of the printer 110. By this means, the PC 170 accesses the web server function of the printer 110, and sends a registration instruction to the printer 110.

When receiving the registration instruction from the PC 170, the printer 110 sends to the print intermediation server 100 a registration request including print condition information which can be used by the printer 110 and a proxy ID of the printer 110. That is, according to the prior art, the registration request including the print condition information which can be actually used by an actual printer (i.e. the printer 110), not virtual print condition information which can be used by a virtual printer, is sent to the print intermediation server 100.

When receiving the registration request from the printer 110, the print intermediation server 100 creates the printer ID for identifying the printer 110 by using the proxy ID of the printer 110 included in the registration request, and associates the created printer ID with the print condition information included in the registration request, and stores them. Then, the print intermediation server 100 sends a response including the created printer ID and a login URL, to the printer 110.

When receiving the response from the intermediation server 100, the printer 110 sends the URL included in the response to the PC 170. Further, the printer 110 stores the printer ID included in the response, and performs polling with respect to the print intermediation server 100 although not illustrated. The polling is performed to establish an XMPP (abbreviation of eXtensible Messaging and Presence Protocol) connection between the printer 110 and the print intermediation server 100 when the print intermediation server 100 successfully authenticates the account information.

When receiving the login URL from the printer 110, the PC 170 sends an access request to the print intermediation server 100 with the login URL as the sending destination, and receives login screen data from the print intermediation server 100 and displays the login screen. Then, the user inputs the account information to the PC 170. In this case, the PC 170 sends the login request including the inputted account information, to the print intermediation server 100.

When receiving the login request from the PC 170, the print intermediation server 100 performs authentication of the account information, and establishes the XMPP connection between the print intermediation server 100 and the printer 110 in response to the polling from the printer 110 when succeeding to authenticate the account information. By this means, so-called always-on connection is established between the print intermediation server 100 and the printer 110, so that it is possible to send a submit notification described below from the print intermediation server 100 located on a WAN side to the printer 110 located on a LAN side.

A submit process performed by using the PC 170 is the same as the submit process performed by using the portable terminal 70 in FIG. 3. By this means, in the print intermediation server 100, the account information, the printer ID, the print condition information and the job information are associated with each other. When performing the submit process, the print intermediation server 100 sends a submit notification including the print instruction to the printer 110 by using the XMPP connection.

When receiving the submit notification from the print intermediation server 100, the printer 110 sends the print data request to the print intermediation server 100, receives the print data from the print intermediation server 100 and performs a print process.

Effect of First Embodiment

As described above, in the prior art process in FIG. 6, the print condition information of the actual printer (i.e. the printer 110) is registered in the print intermediation server 100. When this method is adopted, the user of the PC 170 needs to perform an operation for accessing the web server function of the printer 110 and causes the printer 110 to perform a communication with the print intermediation server 100 in order to register the print condition information of the printer 110 in the print intermediation server 100.

In contrast, in the present embodiment, as illustrated by the registration process in FIG. 2, a method of registering virtual print condition information of a virtual printer in the print intermediation server 100 instead of registering print condition information of an actual printer in the print intermediation server 100 is adopted. By this means, the user of the portable terminal 70 does not have to cause the printer 10 to perform a communication with the print intermediation server 100 in order to register the print condition information (i.e. virtual print condition information) in the print intermediation server 100. Consequently, the user does not have to perform an operation for accessing the web server function of the printer 10, and can easily register the virtual print condition information in the print intermediation server 100.

Further, in the present embodiment, as illustrated by the submit process in FIG. 3, the portable terminal 70 can associate the virtual print condition information, the first AT and the image data 232 with each other in the print intermediation server 100 by sending the submit request 230 including the image data 232, to the print intermediation server 100. Then, as illustrated by the print process in FIG. 5, the portable terminal 70 sends the first AT to the printer 10 by using an NFC communication. As a result, the printer 10 can obtain the print data 292 from the print intermediation server 100 by using the first AT, and perform a print of an image represented by the print data 292. Thus, according to the present technique, the portable terminal 70 can properly cause the actual printer (i.e. the printer 10) to print an image.

Further, in the prior art process in FIG. 6, the XMPP connection (i.e. always-on connection) is established between the printer 110 and the print intermediation server 100, and therefore a communication load between the printer 110 and the print intermediation server 100 is comparatively high. In contrast, in the present embodiment, it is not necessary to establish the XMPP connection between the printer 10 and the print intermediation server 100, so that it is possible to reduce a communication load between the printer 10 and the print intermediation server 100.

Further, in the prior art process in FIG. 6, every time one piece of image data is submitted to the print intermediation server 100, a submit notification is send to the printer 110 from the print intermediation server 100 and the printer performs a print. Hence, if the user uses the PC 170 at a vising place and submits image data to the print intermediation server 100, the printer 110 located at, for example, home performs a print. In this case, a print is performed in a state where the user is not present near the printer 110, and therefore there is a probability that other people may see printed print sheets.

In contrast, in the present embodiment, as illustrated by the submit process in FIG. 3, the printer 10 does not perform a print even if the user submits image data to the print intermediation server 100 by using the portable terminal 70 at a vising place. Consequently, the user can perform submitting the image data to the print intermediation server 100 by using the portable terminal 70 at a visiting place without caring that other people may see printed print sheets. Then, as illustrated by the print process in FIG. 5, when the user places the portable terminal 70 close to the printer 10, this triggers the printer 10 to perform a print. The user can cause the printer 10 to perform a print in a state where the user is present near the printer 10, and obtain printed print sheets without other people seeing printed print sheets.

Further, in the prior art process in FIG. 6, immediately after one piece of image data is submitted to the print intermediation server 100, the printer 110 performs a print. Therefore, the user cannot delete job information from the print intermediation server 100. In contrast, in the present embodiment, as illustrated by the deletion process in FIG. 4, the user can delete the second job information 250 from the print intermediation server 100.

Further, in the prior art process in FIG. 6, the printer 110 needs to store a printer ID and establish the XMPP connection with the print intermediation server 100. Therefore, a load on resources (e.g. a memory) of the printer 110 is high. For example, a situation that the printer 110 is shared by a plurality of users including the user of the PC 170 is assumed. In this case, if a plurality of users performs an operation for registering in the print intermediation server 100 a printer ID of the printer 110, print condition information and the like, the printer 110 needs to store a plurality of printer IDs corresponding to the plurality of users and needs to establish a plurality of XMPP connections with the print intermediation server 100. In this case, a load on the resources of the printer 110 becomes extremely high, and a restriction such that only one printer ID corresponding to one user can be stored is set to the printer 110. In this case, only one user can cause the printer 110 to perform a print via the print intermediation server 100.

In contrast, in the present embodiment, the printer 10 does not have to store a printer ID and, moreover, does not need to establish the XMPP connection with the print intermediation server 100. Further, users which can cause the printer 10 to perform a print via the print intermediation server 100 are not limited to one user (i.e. the user of the portable terminal 70). For example, a user different from the user of the portable terminal 70 can cause the printer 10 to perform a print by performing an operation of performing each process in FIGS. 2, 3 and 5 by using another portable terminal. In this way, according to the present embodiment, each of a plurality of users can cause the printer 10 to perform a print via the print intermediation server 100 by using the portable terminal of the user.

Correspondence Relationship

The printer ID and the first AT are examples of "printer identification information" and "authentication token", respectively. The image data 232 is an example of "target image data" and "image data related information". The normal Wi-Fi scheme and the NFC scheme are examples of "predetermined communication scheme" and "short distance communication scheme", respectively. The NFC I/F 16 and the wireless LAN I/F 18 are examples of "first interface" and "second interface", respectively.

A process of sending the registration request 200 in FIG. 2 in the portable terminal 70 is an example of "sending a registration request". Further, a process of receiving the printer ID included in the response 202 and a process of receiving the first AT included in the login success notification 216 are examples of "receiving authentication information". A process of sending the submit request 230 and a process of displaying the print setting selection screen in FIG. 3, a process of sending the deletion request 274 in FIG. 4 and a process of sending encrypted data in FIG. 5 are examples of "sending image data related information", "obtaining the virtual print condition information", "causing the print intermediation server to delete the image data related information" and "sending the authentication information", respectively.

A process of receiving encrypted data in FIG. 5 in the printer 10 is an example of "receiving authentication information". Sending the job list request 280, receiving the job list 282, sending the print data request 290 and receiving the print data 292 are examples of "sending a request" and "obtain . . . the target print data". Further, a process of supplying the print data 292 to the print performing unit 20 is an example of "controlling the print performing unit to perform a print".

Second Embodiment; FIG. 7

Although the registration process is performed by using the method of OAuth in the first embodiment (see FIG. 2), the registration process using the method of Client Login is performed in the present embodiment.

As illustrated in FIG. 7, the user of the portable terminal 70 activates a printer appl. installed in the portable terminal 70, and selects a button indicating "registration" on the screen displayed in accordance with the printer appl. In this case, the CPU 82 of the portable terminal 70 controls the display unit 74 to display a login screen registered in advance in the printer appl. The user inputs account information to the portable terminal 70 by using the operation unit 72. In this case, the CPU 82 sends a login request 314 including the inputted account information to the print intermediation server 100 via the wireless LAN I/F 78.

When receiving the login request 314 from the portable terminal 70, the print intermediation server 100 performs authentication of the account information included in the login request 314 and creates the first AT when succeeding to authenticate the account information. Next, the print intermediation server 100 associates the successfully authenticated account information with the first AT and stores them. The print intermediation server 100 sends a login success notification 316 including the created first AT, to the portable terminal 70.

When receiving the login success notification 316 from the print intermediation server 100 via the wireless LAN I/F 78, the CPU 82 of the portable terminal 70 stores in the memory 84 the first AT included in the login success notification 316. Next, the CPU 82 sends a registration request 320 including virtual print condition information and a proxy ID to the print intermediation server 100 via the wireless LAN I/F 78.

When receiving the registration request 320 from the portable terminal 70, the print intermediation server 100 creates a printer ID by using the proxy ID included in the registration request 320. Then, the print intermediation server 100 stores the created printer ID and the virtual print condition information. As a result, in the print intermediation server 100, the created printer ID, the account information, the virtual print condition information and the first AT are associated with each other. Then, the print intermediation server 100 sends a registration success notification 322 including the created printer ID to the portable terminal 70.

When receiving the registration success notification 322 from the print intermediation server 100 via the wireless LAN I/F 78, the CPU 82 of the portable terminal 70 stores in the memory 84 the printer ID included in the registration success notification 322. Consequently, the registration process is finished. The submit process, the deletion process and the print process are the same as those in the first embodiment.

Also in the present embodiment, the portable terminal 70 can register the virtual print condition information, the printer ID and the like in the print intermediation server 100, and can provide the same effect as that of the first embodiment. It should be noted that, a process of sending the registration request 320 in FIG. 7 from the portable terminal 70 is an example of "sending a registration request". Further, a process of receiving the first AT included in the login success notification 316 and a process of receiving the printer ID included in the registration success notification 322 are examples of "receiving authentication information".

Modified Embodiment 1

In the above embodiment, in the registration process in FIG. 2, the portable terminal 70 sends the registration request 200 including virtual print condition information to the print intermediation server 100. Instead, when, for example, the virtual print condition information is stored in a data server (i.e. a server provided by the vendor of the printer 10) on the Internet, the portable terminal 70 may send a registration request including a URL of the virtual print condition information, to the print intermediation server 100. In this case, the print intermediation server 100 may obtain the virtual print condition information from the data server by using the URL of the virtual print condition information, and store the obtained virtual print condition information. Further, when the print intermediation server 100 is the server provided by the vendor of the printer 10, the print intermediation server 100 may store the virtual print condition information in advance. In this case, the portable terminal 70 only needs to send a registration request which includes neither the virtual print condition information nor the URL of the virtual print condition information, to the print intermediation server 100.

Modified Embodiment 2

In the above embodiment, the first AT created in the registration process in FIG. 2 is registered in the print intermediation server 100 in a situation that the print process in FIG. 5 is performed. In this regard, when the print process in FIG. 5 is performed, an expiration period of the first AT may end. Hence, in the registration process in FIG. 2, the print intermediation server 100 may create not only the first AT but also a so-called refresh token, and associate the refresh token with account information and the like and store the refresh token. In this case, the print intermediation server 100 can create a new token by using the refresh token when the expiration period of the first AT ends, and store the new token instead of the first AT. Then, the portable terminal 70 receives the login success notification 216 including not only the first AT but also the refresh token from the print intermediation server 100. In the print process in FIG. 5, the portable terminal 70 sends not only the first AT but also the refresh token to the printer 10. In this case, when the expiration period of the first AT ends, the printer 10 can create a new token by using the refresh token, and obtain print data from the print intermediation server 100 by using the new token. In this modified embodiment, the refresh token is an example of "authentication information" and "authentication token".

Modified Embodiment 3

In the above embodiment, in the submit process in FIG. 3, the portable terminal 70 sends the submit request 230 including the image data 232 to the print intermediation server 100. Instead, for example, the portable terminal 70 may send a submit request including a URL of the image data 232 to the print intermediation server 100, when the image data 232 is stored in a data server on the Internet. In this case, the print intermediation server 100 stores the first job information 240 including the URL of the image data 232. Then, in the print process in FIG. 5, when receiving the print data request 290 from the printer 10, the print intermediation server 100 may obtain the image data 232 from the data server by using the URL of the image data 232, convert the obtained image data 232 and create the print data 292. In this modified embodiment, the URL of the image data 232 is an example of "image data related information".

Modified Embodiment 4

In the above embodiment, "authentication information" includes a printer ID and a token (i.e. the first AT). However, if the print intermediation server 100 is configured to be capable of performing authentication by using only the printer ID without using the token, "authentication information" may include only the printer ID without including the token. Further, if the print intermediation server 100 is configured to be capable of performing authentication by using only the token without using the printer ID, "authentication information" may include only the token without including the printer ID. Generally speaking, "authentication information" may be any information used to perform authentication in the print intermediation server.

Modified Embodiment 5

"Virtual printer related information" is not limited to virtual print condition information, and may be information indicating a virtual printer name of a virtual printer, information indicating a virtual default setting of the virtual printer, information indicating a virtual status of the virtual printer or the like. That is, the "virtual printer related information" may be any information which needs to be registered in the print intermediation server and which is related to a virtual printer.

Modified Embodiment 6

In the above embodiment, the virtual print condition information is registered in advance in the printer appl. That is, the memory 84 of the portable terminal 70 stores the virtual print condition information when the printer appl. is installed in the portable terminal 70. Instead, for example, a configuration where the user inputs virtual print condition information to the portable terminal 70 may be employed. In this case, the memory 84 may store the virtual print condition information inputted by the user.

Modified Embodiment 7

In the above embodiment, in the submit process in FIG. 3, the portable terminal 70 displays a print setting selection screen by using virtual print condition information in the memory 84. Instead, the portable terminal 70 may obtain the virtual print condition information from the print intermediation server 100, and display the print setting selection screen by using the obtained virtual print condition information.

Modified Embodiment 8

In the above embodiment, in the print process in FIG. 5, the printer 10 sends to the print intermediation server 100 the print data request 290 including information indicating "PDF" as a data format which can be interpreted (that is, which can be printed) by the printer 10 itself. Instead, the printer 10 sends to the print intermediation server 100 the print data request 290 including information indicating "PWG-Raster" or "XPS (abbreviation of XML Paper Specification)" as a data format which can be interpreted by the printer 10 itself. Generally speaking, an actual printer may send to a print intermediation server a print data request including information indicating a data format which can be interpreted by the actual printer itself.

Modified Embodiment 9

In the above embodiment, in the print process in FIG. 5, the print intermediation server 100 receives the print data request 290 including information indicating a data format from the printer 10, and, consequently, can perform a conversion process on the image data 232 and create the print data 292 including the data format. Instead, in the registration process in FIG. 2, the portable terminal 70 may send to the print intermediation server 100 the registration request 200 including virtual print condition information including information indicating a data format which can be interpreted by a virtual printer. Further, in another modified embodiment, in the submit process in FIG. 3, the portable terminal 70 may send to the print intermediation server 100 the submit request 230 including the print setting information 234 including information indicating a data format which can be interpreted by a virtual printer. According to this configuration, the printer 10 does not include information indicating a data format when sending the print data request 290.

Modified Embodiment 10

In the above embodiment, in the print process in FIG. 5, the portable terminal 70 sends to the printer 10 encrypted data created by encrypting the printer ID and the first AT. Instead, the portable terminal 70 may send the printer ID and the first AT to the printer 10 without encrypting the printer ID and the first AT. Generally speaking, it is enough for "sending the authentication information" to send authentication information to an actual printer.

Modified Embodiment 11

The printer 10 and the portable terminal 70 may perform a communication of encrypted data by performing a short distance wireless communication of another communication scheme (e.g. a wireless communication in accordance with a transfer jet scheme, an infrared scheme or the like) instead of performing a wireless communication in accordance with an NFC scheme. In this modified embodiment, the another communication scheme is an example of "short distance communication scheme". Further, the printer 10 and the portable terminal 70 may perform a communication of encrypted data by performing a wireless communication in accordance with the normal Wi-Fi scheme instead of performing a short distance wireless communication. Furthermore, the printer 10 and the portable terminal 70 may perform a communication of encrypted data by performing a wired communication instead of performing a wireless communication. That is, "first interface" may not be an interface for performing a wireless communication in accordance with the short distance wireless communication scheme, and may be an interface for performing a communication in accordance with the normal Wi-Fi scheme or a wired scheme.

Modified Embodiment 12

The portable terminal 70 may perform a wireless communication in accordance with a cellular scheme such as 3G or 4G and perform a communication with the print intermediation server 100 instead of performing a wireless communication in accordance with the normal Wi-Fi scheme and performing a communication of various pieces of information (e.g. the registration request 200 in FIG. 2) with the print intermediation server 100. Further, the portable terminal 70 may perform a communication with the print intermediation server 100 by performing a wired communication when the portable terminal 70 is connected to the Internet with a wired connection. In this modified embodiment, the cellular scheme or the wired scheme is an example of "predetermined communication scheme".

Modified Embodiment 13

The printer 10 may perform a wired communication and perform a communication of various pieces of information (e.g. the job list request 280 in FIG. 5) with the print intermediation server 100 when the printer 10 is connected to the Internet by way of a wired connection. In this modified embodiment, a wired scheme is an example of "predetermined communication scheme".

Modified Embodiment 14

The print intermediation server 100 may not be one server and may be a plurality of servers which are configured separately. For example, the print intermediation server 100 may have a first server which performs each process illustrated by the registration process in FIG. 2 and a second server (i.e. a second server which is configured separately from the first server) which performs each process illustrated by each process subsequent to FIG. 3.

Modified Embodiment 15

"Terminal device" may not be the portable terminal 70 and may be a desktop PC or another device (e.g. a television).

Modified Embodiment 16

In the above embodiment, the CPU 32 of the printer 10 and the CPU 82 of the portable terminal 70 perform a program (e.g. the printer appl.) in the memories 34 and 84 to implement each process in FIGS. 2 to 5 and 7. Instead, at least one process of each process in FIGS. 2 to 5 and 7 may be implemented by hardware such as a logic circuit.

What is claimed is:

1. A printer comprising:
an interface;
a print performing unit;
a processor; and
a memory storing computer-readable instructions therein, the computer-readable instructions, when executed by the processor, causing the printer to perform:
receiving authentication information from a terminal device via the interface, the authentication information being received from a print intermediation server by the terminal device, the authentication information being associated with virtual printer related information and image data related information in the print intermediation server, the virtual printer related information being related to a virtual printer, the image data related information being related to target image data representing a target image of a print target;
sending, via the interface, a request to the print intermediation server by using the authentication information, the request causing the print intermediation server to send target print data to the printer;
obtaining, via the interface, the target print data from the print intermediation server in response to sending the request, the target print data being created from the target image data by the print intermediation server; and
controlling the print performing unit to perform a print by using the target print data.

2. The printer as in claim 1, wherein
the interface comprises a first interface and a second interface which is different from the first interface.

3. The printer as in claim 2, wherein:
the second interface executes a wireless communication in accordance with a predetermined communication scheme, and
the first interface executes a wireless communication in accordance with a short distance communication scheme, the short distance communication scheme being for executing a shorter wireless communication than the predetermined communication scheme.

4. The printer as in claim 1, wherein:
the receiving of the authentication information includes receiving encrypted authentication information which is created by encrypting the authentication information by the terminal device, and
the computer-readable instructions, when executed by the processor, cause the printer to further perform:
decrypting the encrypted authentication information to create the authentication information.

5. The printer as in claim 1, wherein:
the authentication information includes printer identification information and an authentication token,
the printer identification information identifies the virtual printer,
the receiving of the authentication information includes receiving the authentication information including the printer identification information and the authentication token from the terminal device, and
the sending of the request includes sending the request to the print intermediation server by using the authentication information including the printer identification information and the authentication token.

6. The printer as in claim 5, wherein:
the printer identification information is created by the print intermediation server in response to a registration request that is sent from the terminal device to the print intermediation server, the registration request causing the print intermediation server to register the virtual printer related information in the print intermediation server, and
the authentication token is created by the print intermediation server in response to a login to the print intermediation server that is performed by the terminal device.

7. The printer as in claim 1, wherein
the authentication information is received from the terminal device without using position information indicating a position of the printer.

8. The printer as in claim 1, wherein
the image data related information includes the target image data.

9. The printer as in claim 1, wherein:
the request includes a first request and a second request,
the sending of the request to the print intermediation server includes sending, via the interface, the first request including the authentication information the print intermediation server, and
the first request causes the print intermediation server to send a job list to the printer,
wherein the computer-readable instructions, when executed by the processor, cause the printer to further perform:
obtaining, via the interface, the job list from the print intermediation server in response to sending the first request, the job list including one or more identification information for identifying one or more target image data and one or more position information for indicating one or more positions of the one or more target image data,
wherein the sending of the request to the print intermediation server further includes sending, via the interface, the second request including at least one positon information among the one or more position information to the print intermediation server, after the job list is received from the print intermediation server, and wherein the target print data is obtained from the print intermediation server in response to sending the second request, the target print data being created from the target image data indicated by the at least one positon information included in the second request.

10. A non-transitory computer readable medium storing computer readable instructions that, when executed by a processor of a printer, cause the printer to:

receive authentication information from a terminal device via an interface of the printer, the authentication information being received from a print intermediation server by the terminal device, the authentication information being associated with virtual printer related information and image data related information in the print intermediation server, the virtual printer related information being related to a virtual printer, the image data related information being related to target image data representing a target image of a print target;

send, via the interface, a request to the print intermediation server by using the authentication information, the request causing the print intermediation server to send target print data to the printer;

obtain, via the interface, the target print data from the print intermediation server in response to sending the request, the target print data being created from the target image data by the print intermediation server; and control a print performing unit of the printer to perform a print by using the target print data.

11. A method comprising:

receiving, by a printer via an interface of the printer, authentication information from a terminal device, the authentication information being received from a print intermediation server by the terminal device, the authentication information being associated with virtual printer related information and image data related information in the print intermediation server, the virtual printer related information being related to a virtual printer, the image data related information being related to target image data representing a target image of a print target;

sending, by the printer via the interface, a request to the print intermediation server by using the authentication information, the request causing the print intermediation server to send target print data to the printer;

obtaining, by the printer via the interface, the target print data from the print intermediation server in response to sending the request, the target print data being created from the target image data by the print intermediation server; and controlling a print performing unit of the printer to perform a print by using the target print data.

* * * * *

UNITED STATES PATENT AND TRADEMARK OFFICE
CERTIFICATE OF CORRECTION

PATENT NO. : 9,886,224 B2
APPLICATION NO. : 15/383394
DATED : February 6, 2018
INVENTOR(S) : Fumio Okumura et al.

It is certified that error appears in the above-identified patent and that said Letters Patent is hereby corrected as shown below:

In the Claims

In Column 22, Claim 9, Line 67:
Please delete "at least one positon" and insert --at least one position--

In Column 23, Claim 9, Line 7:
Please delete "at least one positon" and insert --at least one position--

Signed and Sealed this
Twenty-ninth Day of May, 2018

Andrei Iancu
*Director of the United States Patent and Trademark Office*